Sept. 30, 1941.      O. B. GERDIN      2,257,415
FISHLINE SINKER
Filed May 24, 1940
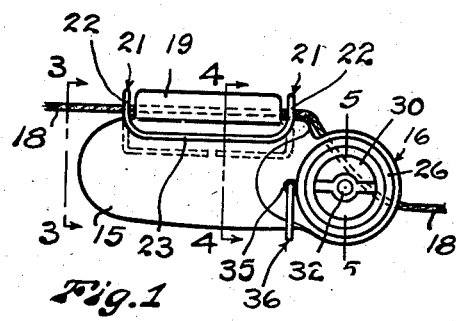
Fig.1
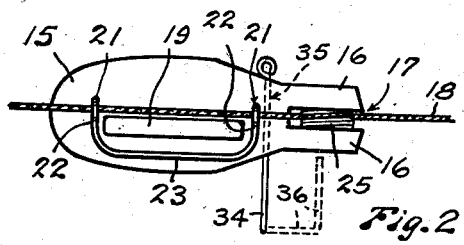
Fig.2
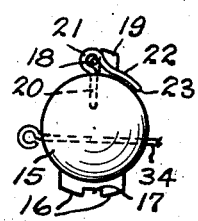
Fig.3
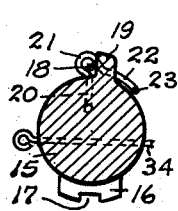
Fig.4
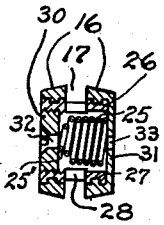
Fig.5
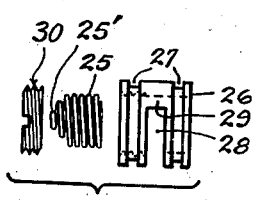
Fig.6
Fig.7
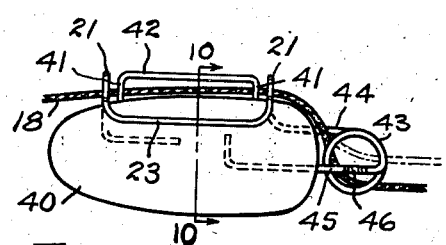
Fig.8
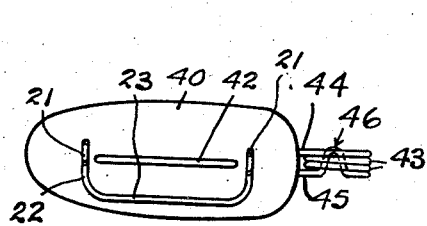
Fig.9
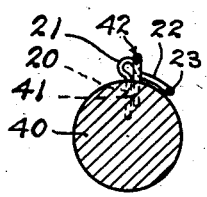
Fig.10
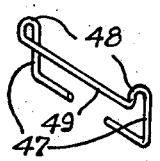
Fig.11
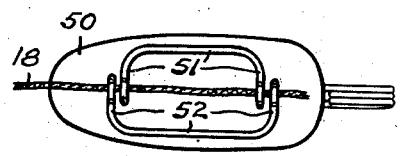
Fig.12
INVENTOR.
Olof B. Gerdin
BY Bryant & Lowry
ATTORNEYS Patented Sept. 30, 1941

2,257,415

UNITED STATES PATENT OFFICE 2,257,415

FISHLINE SINKER

Olof B. Gerdin, Seattle, Wash.

Application May 24, 1940, Serial No. 337,055

6 Claims. (Cl. 43—52)

My invention relates to fish line sinkers and particularly to means for connecting such sinkers with fish lines.

An object of my invention is to provide a fish line sinker having hook like means for receiving and guiding a fish line whereby the sinker may be quickly and easily engaged with or disengaged from a fish line by a hooking or unhooking operation and without requiring detachment of the hooks or the threading of the end portion of the line through any holes or openings in the sinker.

Another object is to provide fish line holding and guiding means that is well adapted to cooperate with friction type line gripping means of the form employed in so called "slip sinkers" in which the line is released from the grip of the sinker by the pull of a fish, leaving the sinker free to slide down along the line as the line is reeled in.

Another object is to provide resilient line gripping devices for use with a slip sinker of this type, which line gripping devices are adjustable to vary the grip on the line.

A further object is to provide resilient line gripping devices for use with a slip sinker of this type, which line gripping devices are provided with means for the reception of a manually insertable line locking member for holding the line so that it can not be released by a pull.

In fishing for salmon and like fish it is common practice for fishermen to carry sinkers of a plurality of different weights and sizes and to change these sinkers frequently on the line to vary the trolling depth until the best depth at which to fish is ascertained. As the fish will often change their depth, the sinkers must be changed frequently and my sinker facilitates quick and easy change without removing the hooks and leaders. Also sinkers of this type are usually slidably mounted on the line at a considerable distance, such as ten to thirty feet, from the hooks and are attached to the line by friction clamp means which will be released by the strike or pull of a fish and permit the sinker to slide down the line toward the hooks. This allows the line to be reeled in until the hooks are substantially at the end of the pole. My line guiding means is particularly well adapted for use on slip sinkers that are changed frequently on the line and that release their grip on the line when a fish strikes and slide down toward the hook.

Other objects of my invention will be apparent from the following description taken in connection with the accompanying drawing.

In the drawing,

Fig. 1 is a side elevation of a fish line sinker constructed in accordance with my invention showing a fish line operatively connected therewith.

Fig. 2 is a plan view of the same.

Fig. 3 is an end elevation of the same looking in the direction indicated by arrows 3—3 of Fig. 1.

Fig. 4 is a sectional view on broken line 4—4 of Fig. 1.

Fig. 5 is a sectional view substantially on broken line 5—5 of Fig. 1.

Fig. 6 is an exploded elevation showing three of the line gripping parts illustrated in Fig. 5.

Fig. 7 is a detached perspective view of a line guiding member embodied in the invention showing the same as it may appear before it is cast into a sinker and bent into final shape.

Fig. 8 is a side elevation of another embodiment of this invention.

Fig. 9 is a plan view of the sinker shown in Fig. 8.

Fig. 10 is a sectional view taken substantially on broken line 10—10 of Fig. 8.

Fig. 11 is a detached perspective view of a modified form of line retaining member.

Fig. 12 is a plan view of another embodiment of this invention using two relatively wide hook shaped line engaging members.

Figs. 1 to 7 show one embodiment of the invention comprising a lead sinker body 15, which may be of any shape but which, for the purpose of this illustration, is shown to be of substantially cylindrical cross section and of substantially greater length than diameter.

The rear end portion of the sinker body 15 is rounded and the front end portion thereof is provided with two flat parallel disc members 16 cast integral therewith and having a slot 17 therebetween.

The line guiding means for receiving and guiding a fish line 18 comprises a line retaining member in the form of a flange or fin 19 projecting outwardly from the sinker body 15 and extending longitudinally thereof substantially in the plane of the slot 17 and a relatively wide hook shaped line receiving member cooperating with said flange 19 to releasably receive a line 18. The hook shaped member comprises two post portions 20 embedded in the sinker body 15 near the respective ends of the line retaining member 19, two eye shaped portions 21 formed in said post portions for receiving and engaging the line, two transversely extending curved end portions 22 extending transversely of the sinker body crosswise of the ends of the line retaining member 19, and a longitudinal bar or tip portion 23 connecting the curved portions 22. The lower ends of post portions 20 are preferably bent inwardly toward each other to provide better anchorage in the sinker.

The hook shaped line receiving member is preferably formed of one integral piece of wire. The eye members 21 are positioned to one side of the flange 19 and the tip bar 23 is positioned at the other side of said flange 19. The curved side portions 22 extend past the ends of the flange 19 and are preferably spaced just far enough from the ends of the flange 19 to allow the fish line 18 to be passed therebetween in connecting the sinker with the line or disconnecting it therefrom. The hook shaped line receiving member is preferably in the shape shown in Fig. 7, at the time the sinker is molded and the parts 22 and 23 are later bent down into the position shown in Figs. 1 to 4.

The resilient line clamp means disclosed in Figs. 1 to 6 comprises a helical spring 25 disposed within a slotted tubular housing 26 that is molded into the discs 16 at the front end of the sinker body 15. Two external annular grooves 27 in the housing 26 become filled with lead when the sinker is cast and this permanently anchors the housing 26 in the sinker. A transverse slot 28 extends partially through the housing 26 leaving the two end portions thereof connected by a metal section 29. The slot 28 coincides with the slot 17 between the disc members 16, the slot 17 being formed, in the molding process, by a suitable core member that is positioned in the slot 28 at the time the molten metal is poured. One end of the tubular housing 26 is internally threaded for the reception of an externally threaded screw plug 30. The other end portion of the housing 28 is closed by a wall 31 of lead which is formed in the casting process. The spring 25 has its wound coils close together so that the line 18 may be drawn between these coils and will be yieldingly clamped thereby. The coils 25' at one end of the spring 25 are tapered sufficiently to dis-align said coils so that they will flatten like a cone shaped compression spring and will not be jammed tightly against each other but will have a greater range of resiliency as they are compressed. The clamping force exerted by the spring 25 on the line 18 may be varied by adjusting the screw plug 30.

Two aligned holes 32 and 33 are provided in plug 30 and wall 31 respectively in which any suitable straight member of small diameter, such as a cotter pin or a piece of wire, may be inserted in front of the line 18 to form a positive locking means for the line. Also if desired a locking member may be carried by the sinker. In Figs. 1 and 2, I have shown a transversely disposed substantially J shaped movable locking member having a longer arm 34 supported in a transverse hole 35 in the sinker body 15 and a shorter arm 36 shown by broken lines in Fig. 2 and positioned so that it may be projected through or withdrawn from the holes 32 and 33. If desired the J shaped locking member may be omitted and a separable locking member such as a cotter pin or piece of wire carried in the hole 35 to be used when desired to lock the line.

In Figs. 8, 9 and 10, I have shown another embodiment of this invention comprising a sinker body 40 having a hook shaped member identical with the hook shaped member of Figs. 1 to 7 and with the parts thereof correspondingly numbered. A line retaining member, comprising two post portions 41 embedded in and extending outwardly from the sinker and a bar 42 connecting said two post portions, is provided in place of the line retaining flange member 19 of Figs. 1 to 4 and functions in the same manner to help hold and guide the line 18.

The releasable line clamp shown in Figs. 8, 9 and 10 comprises a closed coil 43 of resilient wire positioned at the front end of the sinker body substantially in the same plane as the line retaining member 41—42. The two terminal wires 44 and 45 of the coil 43 are embedded in the sinker body and provide a rigid connection between the sinker body and the coil. One of these end members 45 preferably extends across the coil 43 as shown in Fig. 8, and has an inwardly bent portion 46 that projects into the coil. If the line 18 is drawn deeply into the coil so that it is engaged back of this inwardly bent portion 46 it will require a harder pull to jerk said line loose than will be required if the line is held in the coil but not engaged back of portion 46. In Fig. 8, I have shown, partly by dotted lines, the hook shaped line engaging member and the releasable line clamp member as formed of one single integral piece of wire.

In Fig. 11, I show a line retaining member similar to the member 41—42 of Figs. 8, 9 and 10 except that the posts 47 thereof are bent to form hook shaped portions 48 which are connected by a bar 49. In use the hook shaped portions 48 engage with the line and provide an additional safeguard against accidental loss of the sinker from the line.

In Fig. 12, I show a sinker body 50 provided with two relatively wide hook members 51 and 52 with their tip portions turned in opposite direction. The hooks 51 and 52 are similar to the hook 21—22—23 and one of said hooks is sufficiently shorter than the other so that the post portions thereof may be positioned between the post portions of the longer hook.

To apply this sinker to a fish line the operator passes any desired portion of the line under the tip bar 23 and side portions 22 of the hook shaped line engaging member and then passes the same over the line retaining member 19 of Figs. 1 to 4 or 41—40 of Figs. 8 to 10, and then draws the line straight through the eye members 21. In the sinker shown in Fig. 12 the line is drawn first under one hook member and then under the other. This quickly and easily engages the sinker with the line in such a manner that it is adjustable along the line but will not be accidentally detached therefrom. To releasably clamp the sinker at any desired location on the line the line is drawn between the coils of the resilient clamp member, 25 of Figs. 1 to 6 or 43 of Figs. 8 to 10. The sinker is quickly and easily removed from the line by lifting the portion of the line which is back of the line retaining member, in either Fig. 1 or Fig. 8, over said line retaining member and then drawing the line out from under the portions 22 and 23 of the hook member.

The grip of the line clamp shown in Figs. 1 to 6 can be varied by adjusting the plug member 30 to provide more or less compression in the spring 25 as may be desired. Also the insertion of a locking member in holes 32—33, and in front of the line 18, will positively hold such line and prevent it from being jerked loose from the line clamp when a fish strikes if this mode of operation is desired.

In the structures of both Fig. 1 and Fig. 8, there is a bend in the line between the line guiding means and the line clamping means. This insures that the line will be released from the line clamp when it is straightened out by the pull of a fish.

Obviously changes in the construction of my fish line sinker may be made within the scope of the following claims.

I claim:

1. In a fish line sinker, a sinker body; a relatively wide hook shaped line engaging member having two spaced apart side portions secured to said sinker body in spaced apart relation longitudinally of said sinker body and having a tip bar connecting said two side portions and extending longitudinally of said sinker body and positioned close to said sinker body; and fish line retaining means rigid with said sinker body and extending outwardly therefrom and positioned between said side portions of said hook shaped member, whereby said sinker may be operatively engaged with a fish line at a location in the line removed from the ends thereof by passing a portion of the fish line under said hook shaped member and over said line retaining member.

2. In a fish line sinker, a sinker body; a relatively wide hook shaped line engaging member comprising two post portions rigid with said sinker body and projecting outwardly therefrom and spaced apart longitudinally of said sinker body, two side portions connected with said post portions and extending transversely of said sinker body in close proximity thereto, a tip bar connecting said side portions and extending longitudinally of said sinker body in close proximity thereto; and line retaining means rigid with said sinker body and protruding therefrom and positioned between said side portions of said hook shaped member, whereby a fish line that is passed under said tip bar and said side portions and over said line retaining member will be guided between said line retaining member and said post portions.

3. In a fish line sinker, a sinker body; fish line guiding means connected with said sinker body; coil spring means connected with one end portion of said sinker body for releasably holding a fish line; and devices for adjusting said coil spring means to adjustably vary the line gripping strength of the same.

4. In a fish line sinker, a sinker body having two spaced apart integral plate portions adjacent one end portion thereof; a tubular spring housing secured within said plate portions and having a slot registering with the space between said plate portions; a removable plug member adjustably threaded into one end portion of said tubular housing; a helical spring member within said housing adapted to releasably receive a fish line and adjustable by adjustment of said plug member; and fish line guiding means operatively connected with said sinker body.

5. In a fish line sinker, a sinker body having two spaced apart integral plate portions adjacent one end thereof; a tubular spring housing secured within said plate portions and having a slot registering with the space between said plate portions; a removable plug member adjustably threaded into one end portion of said tubular housing, the other end of said tubular housing being provided with a wall; a helical spring member within said housing adapted to releasably receive a fish line and adjustable by adjustment of said plug member, said plug member and said wall at the end of said tubular housing being provided with aligned passageways whereby a pin member may be inserted therein to prevent removal of a fish line from said spring member; and fish line guiding means operatively connected with said sinker body.

6. In a fish line sinker, a sinker body; two relatively wide hook shaped fish line engaging members each having two spaced apart side portions secured to said sinker body in spaced apart relation longitudinally of said sinker body with the two side portions of one hook member positioned between the two side portions of the other hook member and said hook members extending in opposite directions, each hook member having a tip bar connecting its two side portions and extending longitudinally of said sinker body and positioned close to said sinker body whereby said sinker may be operatively engaged with a fish line at a location removed from the ends of the line by passing a loop portion of the fish line first under one hook shaped member and then under the other hook shaped member; and friction clip line gripping means secured to said sinker body adjacent one end thereof for receiving and holding a fish line.

OLOF B. GERDIN.